N. M. BAKER.
OPHTHALMIC MOUNTING.
APPLICATION FILED APR. 3, 1914.
1,241,903. Patented Oct. 2, 1917.
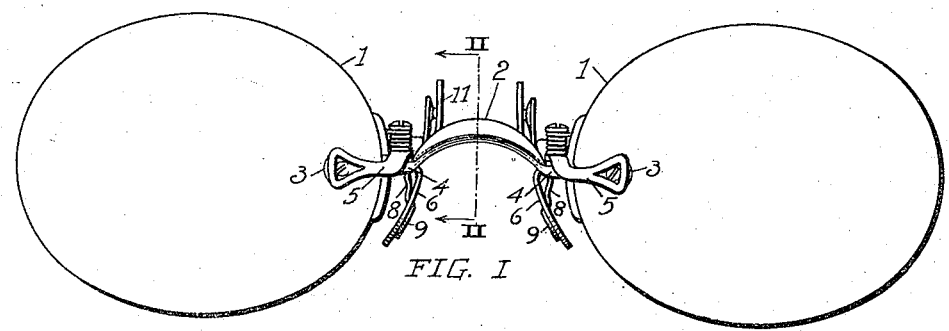
FIG. I
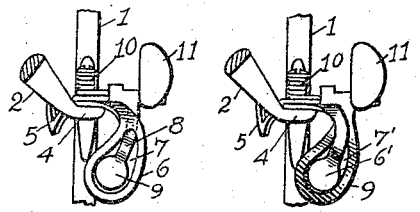
FIG. II   FIG. III   FIG. IV   FIG. V
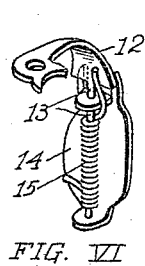 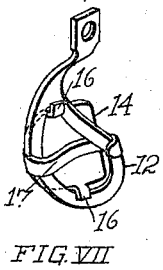 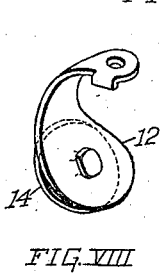  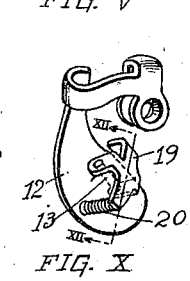
FIG. VI   FIG. VII   FIG. VIII   FIG. IX   FIG. X
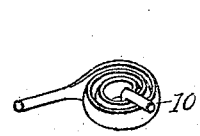 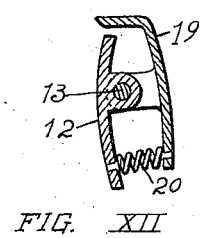
FIG. XII
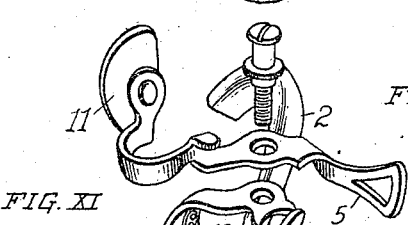 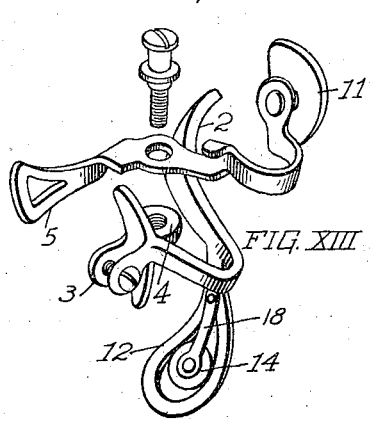
FIG. XI   FIG. XIII
WITNESSES:
Joseph D. Emery
Florence E. Coderre
INVENTOR
NELSON M. BAKER
BY
H. H. Stylo & H. K. Parsons
ATTORNEYS

UNITED STATES PATENT OFFICE.

NELSON M. BAKER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,241,903.  Specification of Letters Patent.  Patented Oct. 2, 1917.

Application filed April 3, 1914. Serial No. 829,248.

*To all whom it may concern:*

Be it known that I, NELSON M. BAKER, a citizen of the United States, residing at Southbridge, in the county of Worcester and State of Massachusetts, have invented certain new and useful Improvements in Ophthalmic Mountings, of which the following is a specification.

My invention relates to improvements in ophthalmic mountings and has particular reference to a mounting of what is commonly known as the pince-nez type, that is, a mounting held in place by means associated with the bridge or connecting member for the lenses.

The leading object of my invention is the provision of an improved manner of retaining a mounting in predetermined position on the face of the wearer, and of novel and improved means for attaining this result.

A further object of my invention is the provision of an improved mounting embodying means other than the usual bridge or lens connecting member, which shall be shaped to conform to the nose of the wearer to support and position the mounting, and which in addition shall be provided with gripping means for securing the mounting against forward tilting or sliding movement either above or below the center of the mounting.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front elevation of a mounting embodying my improvement.

Fig. II represents a sectional view on the line II—II of Fig. I.

Fig. III represents a similar view of a slightly modified construction.

Fig. IV illustrates another form thereof.

Fig. V is a further embodiment of the same idea.

Fig. VI illustrates the use of an automatic lower gripping member.

Fig. VII illustrates a different construction for attaining the same result.

Fig. VIII illustrates another form thereof.

Fig. IX illustrates a slight variation of Fig. VIII.

Fig. X represents another type of automatic gripping member.

Fig. XI represents a still further embodiment thereof.

Fig. XII represents a sectional view on the line XII, and

Fig. XIII represents a perspective view of another form of my mounting with parts in disassembled relation.

In the drawings, in which similar characters of reference are employed to denote corresponding parts throughout the several views, the numeral 1 designates the lenses connected by a bridge member 2 having at its ends the lens engaging clips 3. This bridge is preferably provided as at 4 with seats for the finger piece or other pivoted levers 5 which are preferably suitably spring actuated to swing the inner ends of the same inward into engagement with the nose.

In the fitting of eyeglasses, and particularly eyeglasses of the pince-nez type, there are certain primary considerations which must be carefully observed if the lenses are to prove most efficient in correcting the visual defect of the wearer. Among these points might be mentioned the necessity of having the mounting each time occupy the same position on the face as that in which the lens is fitted, for should the mounting be placed slightly higher or lower on the face than the intended point prismatic effects will be produced by the lens subjecting the eye to considerable strain, as with an unintended prism present certain of the muscles of the eye must at all times be under tension to try and balance the prism, this being liable to produce headaches and other disagreeable effects to the wearer.

A further necessity in the fitting of pince-nez eyeglasses is that the glasses be constructed to comfortably engage the nose without any undue pressure thereagainst to irritate the same, and to at the same time firmly grasp the nose to prevent falling off of the glasses. This falling off occurs in one of two ways, either in the more usual way in which the top of the lenses being slightly forward will tend to tilt the mounting to swing substantially on its center as an axis, the guards gradually slipping out of engagement with the upper portion of the nose and the mounting rolling forward off the face. Should this tendency be corrected, however, by putting most of the retaining pressure at the upper part of the nose and correspondingly decreasing the pressure on the lower part, the glasses while securely held for all ordinary use will sometimes have a tendency to slip in the case of a person doing clerical or other work requiring them to lean considerably forward. In this event the action will be that of forward slipping at the lower portion of the nose, the mounting rolling or tilting from the bottom outward.

It is the purpose of my present invention to provide against both of these contingencies, and at the same time insure correct positioning of the mounting on the face. In the attainment of this object, as will be noted in the drawings, I have employed a lower weight bearing member supported for adjustment to be fitted to the side of the nose of the wearer, and have then provided two distinct gripping members, one for engaging the loose flesh at the top of the nose and preventing the ordinary forward tilting of the mounting, the other for gripping the lower part of the nose and preventing sliding forward of the mounting at the bottom when one is leaning over.

Referring specifically to the drawings: In that form of my invention illustrated in Fig. II, I have shown a lower weight supporting member 6 having an aperture 7 formed therein, and have shown the lever 5 as provided with an adjustable portion 8 terminating in a bearing pad 9 adapted to pass through the aperture 7 as the lever is actuated by its spring 10, so that both the upper pad 11 and the lower pad 9 will grip the nose to prevent slipping, while the weight of the mounting will be supported by the fixed member 6, the two members thus being so adjusted as to fit properly at but one point on the nose, thus insuring correct positioning of the mounting before the eye.

In Fig. III, I have shown a reversal of the lower portion of my guard just described, in that I employ the adjustable weight supporting member 6' and form the aperture 7' in the lower pad 9, the weight supporting member 6', therefore, projecting through the aperture in the moving pad 9, in place of the pad 9 projecting through an aperture in the moving member.

In Fig. IV the structure as illustrated is quite similar to that shown in Fig. III, the difference being that the lower member 9 comprises two arms or branches spanning the pad 6', in place of a continuous looped member, the operation being otherwise the same in both instances.

In Fig. V, I also make use of the same principle, but employ merely two parallel guards, one being rigid and one stationary, in place of having two parts on one of the guards disposed on opposite sides of the other guard member.

In Fig. VI, I have illustrated a combination lower guard member comprising the rigid but adjustable portion 12 having the pintle 13 on which is rotatably mounted the gripping pad 14, said pad being actuated by a spring 15 to swing its front edge inward into gripping engagement with the nose, the pad, therefore, operating automatically and not being controlled by the finger piece lever, as in the prior forms.

In Fig. VII, I have again illustrated a resiliently mounted lower pad, in this instance, however, the pad 14 having a plurality of tongues 16 for clampingly engaging the guard 12 and having an integral or attached spring portion 17 for actuating the same.

The form shown in Fig. VIII illustrates the use merely of a wabbly lower pad which will automatically swing as the mounting tends to slide, and will grip the nose to prevent slipping of the mounting without the use of spring actuating means therefor.

Fig. IX illustrates a similar construction with the use of a blade spring 18 for accentuating the action of the pad.

In Figs. X and XII I have shown as disposed on the rear face of the guard 12 and the pintle 13, on which is mounted the hook-like guard member 19 actuated by the spring 20 which serves to swing the said member 19 around into biting or gripping engagement with the nose to prevent slipping of the mounting.

Figs. XI and XIII illustrate a form similar in several respects to Figs. VII and IX, in that the lower pad 14 operates through an aperture in the guard proper 12 and is actuated through said aperture by the blade spring 18.

From the foregoing description taken in connection with the drawings, the construction and operation of my improved mounting should be readily apparent, and it will be seen that I have provided a mounting in which the weight supporting members may be adjusted to exactly fit the nose when the mounting is in correct position upon the face, in which the upper gripping members are resiliently supported and engage the flesh at the upper portion of the nose to prevent forward tilting movement, while additional lower members are provided which grip the lower part of the nose and prevent forward sliding of the weight supporting members.

I claim:—

1. In an ophthalmic mounting, the combination with a bridge member of bearing members rigidly secured and depending from the bridge member for supporting the weight of the mounting, guard arms pivotally supported on the bridge and having upwardly extending portions terminating in upper nose gripping pads for retaining the mounting against forward tilting movement on the face, and supplemental resiliently actuated lower bearing pads disposed immediately adjacent, the bearing portion of the lower nose engaging members for movement inwardly relative thereto to grippingly engage the lower portion of the nose and prevent forward slipping of the weight supporting members.

2. In an ophthalmic mounting, the combination with a bridge member, of nose engaging members rigidly secured to the bridge member and depending therefrom, said members having an outer bearing portion surrounding a central aperture, upper gripping pads, mounted on the bridge for securing the mounting against tilting on the face, and supplemental lower resiliently actuated gripping members operating through the apertures in the lower nose engaging members for clampingly engaging the nose to retain the lower members in proper position thereon.

3. In an ophthalmic mounting, the combination with a bridge of perforated lower rests depending from the bridge, levers pivoted on the bridge and bearing upper clamping members for retaining the mounting against forward tilting on the face, and supplemental lower gripping members carried by the levers and having portions operating through the apertures in the lower rests to supplement the action of the rests in supporting the mounting and preventing outward swinging of the lower portions thereof, substantially as illustrated.

4. An ophthalmic mounting, including a bridge for spanning the nose of the wearer, rigidly secured adjustable positioning members depending from the bridge for insuring correct positioning of the bridge on the face, and resiliently actuated means for clamping the mounting in position on the face as determined by the bridge and positioning members, said clamping means including upper pads for engaging the upper portion of the nose and preventing forward tilting movement of the mounting and lower pads for engaging the nose and preventing forward sliding or twisting movement of the positioning members.

In testimony whereof I affix my signature in presence of two witnesses.

NELSON M. BAKER.

Witnesses:
H. K. PARSONS,
FLORENCE E. CODENE.

Copies of this patent may be obtained for five cents each, by addressing the "Commissioner of Patents, Washington, D. C."